Sept. 10, 1968   C. F. CARLSON   3,400,630
PHOTOGRAPHIC COPYBOARD
Filed May 20, 1965
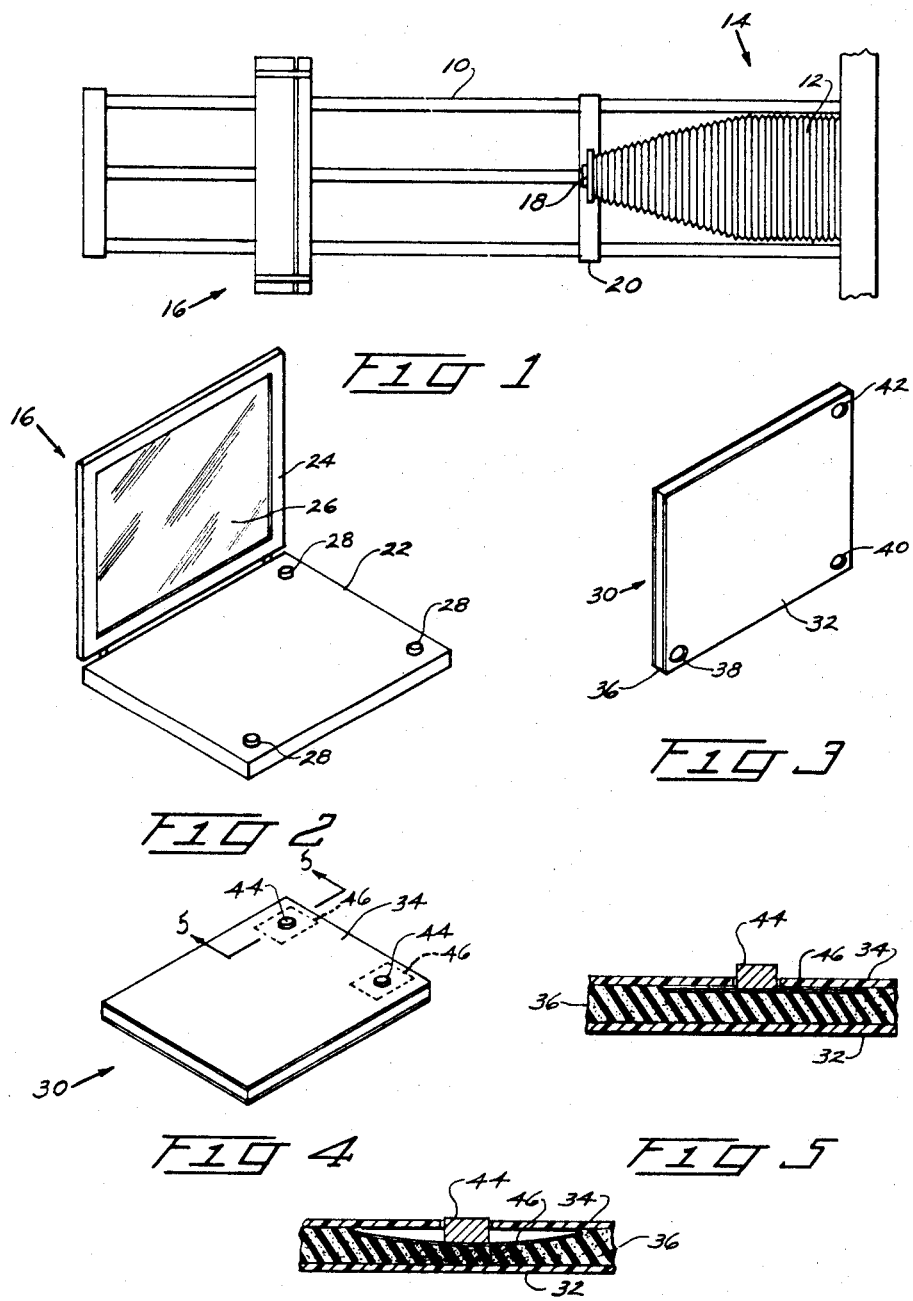
CHESLEY F. CARLSON
INVENTOR.
BY H. F. Woodward
Atty.

United States Patent Office 3,400,630
Patented Sept. 10, 1968

3,400,630
PHOTOGRAPHIC COPYBOARD
Chesley F. Carlson, 2230 Edgewood Ave.,
Minneapolis, Minn. 55427
Filed May 20, 1965, Ser. No. 457,400
3 Claims. (Cl. 88—24)

ABSTRACT OF THE DISCLOSURE

A photographic copyboard having a base with a hinged cover. A resiliently yieldable pressure pad is removably positioned on the base for uniformly pressing an apertured work sheet against the cover when the latter is closed. The pad consists of a resilient cushion sandwiched between two rigid plates. Retractable pins project from one of the plates to locate the apertured work sheet, the locating pins being retractable against the resilient cushion by closing of the cover.

---

This invention relates to a novel and improved copyboard adapted for a variety of operations attendant upon photography. The copyboard may be employed to support an original or text at a proper focal distance from a camera.

Objects and advantages of the invention will be set forth in part hereinafter and in part will be obvious herefrom or may be learned by practice with the invention, the same being realized and attained by means of the instrumentalities and combinations pointed out in the appended claims.

The invention consists of the novel parts, construction arrangements, combinations and improvements herein shown and described.

The accompanying drawings referred to herein and constituting a part hereof illustrate one embodiment of the invention and together with the description serve to explain the principles of the invention.

In the drawings:

FIGURE 1 is a top plan view of the essential parts of a copyboard in position for holding a print or the like, to be photographed by a camera;

FIGURE 2 is a perspective view of a copyboard showing location of pins therein;

FIGURE 3 is a perspective view showing the backside of the improved copyboard insert;

FIGURE 4 is a perspective view of the copyboard insert showing the front or face side of the insert of FIGURE 3;

FIGURE 5 is a sectional view taken on lines 5—5 of FIGURE 4; and

FIGURE 6 is a sectional view similar to FIGURE 5 with the copy holding pin depressed.

In general, initial control of the register should begin in many jobs in the art preparation or pasteup of copy. With pin register control used in the vacuum back of camera, stripping, platemaking, etc., would greatly be expedited if such control included the copyboard of a camera. A purpose of the improvements is to provide a means of establishing a register control system for the copyboard.

As shown in FIGURE 1, 10 indicates a bed upon which is supported the bellows 12 of a camera unit generally designated as 14. The bed 10 supports the copyboard 16 and in the position shown carries the material to be photographed by the camera 14.

The bed 10 could extend into a dark room through a wall with the back of the camera within the dark room. The bed 10 of course extends into a room adjacent the dark room and has mounted thereon the copyboard 16. The copyboard is generally pivotally mounted as shown in U.S. Patent 2,554,712, so that it can be moved from a vertical exposure position to a horizontal loading position. The copyboard is movable along the bed 10 in relationship to the camera.

It will of course be understood that a suitable lens unit 18 is provided for the camera 14, the lens unit being carried on an adjustable carriage 20 which slides on the bed or frame 10.

The copyboard 16 comprises a suitable base 22 which may be a solid rectangular plate, and a suitable border member or cover 24 carrying a transparent glass sheet 26. The border member 24 is hinged to the base 22 in any suitable manner known in the art.

Suitable means at the upper edge of two members of the border member for locking the overlaying member 24 carries glass 26 to base 22. The locking means used may be that shown in the patent referred to above.

In the base 22 adjacent the edges are positioned two or more locating elements or pins 28. Two pins 28 may be used but it is preferred that three pins be employed as shown in FIGURE 2.

FIGURES 3 and 4 show my new insert or pressure pad to be employed with the copyboard 16. The insert generally shown at 30 comprises a sandwich construction of two sheets or plates of relatively rigid material. These sheets 32 and 34 may be made of polyvinyl chloride or any other suitable material. Positioned between sheets 32 and 34 and adhesively attached thereto is elastic cushion 36. The elastic cushion 36 can be urethane which has proven very satisfactory, or it may be of rubber or the like material. In fact the core may be of any material that is elastic and compressible or that has the characteristics of being compressed when pressure is applied and springing back to the original shape when the pressure is removed.

The sheet or board-like member 32 has openings 38, 40 and 42 drilled or punched therethrough for the reception of pins 28. These openings must have a definite relationship to pins or nibs carried by the sheet or board 34. The sheet or board 34 has positioned therethrough nibs or pins 44 which project above the surface of the sheet when not under pressure. It is to be understood that more than two pins 44 may be employed in board 34. The pins 44 are located by means of openings in the sheet or board 34. The pins are mounted on a thin base or panel 46 shown in FIGURES 4 and 5. The pins are secured in about the center of the bases 46. The bases are generally flexible and may be of .010″ stainless steel. The bases 46 rest on the compressible center cushion 36 and the base is of a size much larger than the pins or nibs 44.

Under pressure by the cover 24 of the copyboard the pins are forced downwardly into the compressible material 36 until the tops of the pins 44 are substantially parallel with the top of the material to be photographed. When the pressure is released on the pins the compressed cushion 36 returns the pins to the raised position shown in FIGURE 5.

The pins or nibs 44 are positioned in the insert 30 so as to bring the material to be photographed into alignment with the axis of the camera lens whenever the material is of a predetermined size and positioned properly in relation to holes either punched through the material to be photographed or to tabs, with prepunched holes, that are taped to the material to be photographed.

The positioning of such material to be photographed by means of placing holes over pins 44 sets up a relationship with prepunched film positioned over fixed pins in the vacuum back of the camera. In this manner a continuity of register control is obtained from art preparation to copyboard to prepunched film and to the negative exposed under these conditions.

The art work, keyline drawing, pasteup copy, or other work sheet to be photographed has holes punched therein or prepunched tabs are taped to such material. The insert or vehicle 30 is positioned in the copyboard by placing the pins 28 into holes 38, 40 and 42. This establishes a proper relationship of pins 44 to the axis of the lens of the camera. The material to be photographed is then placed so that holes therein are over pins 44. The cover of the copyboard is closed which forces the pins 44 into the position shown in FIGURE 6. This sets up an overall compression on the insert 30 which provides a pressure of copy against the glass 26. The cameraman then positions prepunched film over pins in the vacuum back of the camera 14 to establish a relationship between the copy in the copyboard and the film in the vacuum back of the camera. A normal exposure is made on the film. If a subsequent exposure is to be made on the same piece of film the second piece of material is positioned over pins 44. The subsequent exposure then provides an exact register of the two images on the prepunched film in the vacuum back of the camera. This operation gives a continuity of register control from art preparation, through the copyboard and onto the film.

I claim:

1. A photographic copyboard comprising in combination a base, a cover hingedly connected to said base, a set of upstanding locating elements provided on the base, and a resiliently yieldable pressure pad removably positioned between said base and said cover for uniformly pressing an apertured work sheet against the cover and locating the work sheet in position when the cover is closed, said pressure pad comprising lower and upper rigid plates, a cushion of resilient material sandwiched between and adhesively secured to said plates, the lower plate of said pad being provided with openings receiving said locating elements therein when the pad is positioned on said base, and resiliently retractable locating pins projecting from the upper plate of said pad into apertures of a work sheet, said locating pins being retractable by closing of said cover upon said pressure pad.

2. The device as defined in claim 1 wherein said locating pins are slidable through apertures formed in the upper plate of said pad and are resiliently urged to their projected position by said cushion.

3. The device as defined in claim 2 together with flexible base panels provided at the lower end of said locating pins below said upper plate and resting on said cushion.

References Cited

UNITED STATES PATENTS

| 1,745,900 | 2/1930 | Lowen | 88—24 |
| 2,599,859 | 6/1952 | Ogg | 88—24 |

NORTON ANSHER, *Primary Examiner.*

R. A. WINTERCORN, *Assistant Examiner.*